(12) United States Patent
Pandey et al.

(10) Patent No.: US 11,347,968 B2
(45) Date of Patent: May 31, 2022

(54) IMAGE ENHANCEMENT FOR REALISM

(71) Applicant: Ford Global Technologies, LLC, Dearborn, MI (US)

(72) Inventors: Gaurav Pandey, College Station, TX (US); Gautham Sholingar, Sunnyvale, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 148 days.

(21) Appl. No.: 16/800,128

(22) Filed: Feb. 25, 2020

(65) Prior Publication Data
US 2021/0264201 A1  Aug. 26, 2021

(51) Int. Cl.
| | |
|---|---|
| *G06K 9/00* | (2022.01) |
| *G06K 9/62* | (2022.01) |
| *G06V 10/46* | (2022.01) |
| *G06V 20/56* | (2022.01) |

(52) U.S. Cl.
CPC ......... *G06K 9/6256* (2013.01); *G06K 9/6232* (2013.01); *G06V 10/469* (2022.01); *G06V 20/56* (2022.01); *G06V 2201/08* (2022.01)

(58) Field of Classification Search
None
See application file for complete search history.

(56) References Cited

U.S. PATENT DOCUMENTS

| | | | |
|---|---|---|---|
| 9,767,565 B2 * | 9/2017 | Estrada | G06K 9/6267 |
| 10,019,655 B2 * | 7/2018 | Krishnamurthy | G06F 16/583 |
| 10,152,655 B2 * | 12/2018 | Krishnamurthy | G06K 9/6255 |
| 10,242,292 B2 | 3/2019 | Zisimopoulos et al. | |
| 10,321,747 B2 | 6/2019 | Tamura et al. | |
| 10,713,569 B2 * | 7/2020 | Ros Sanchez | G06T 5/50 |
| 10,872,271 B2 * | 12/2020 | Zagaynov | G06T 5/002 |
| 11,188,790 B1 * | 11/2021 | Kumar | G06K 9/6257 |
| 2017/0061625 A1 * | 3/2017 | Estrada | G06N 3/0454 |
| 2018/0060701 A1 * | 3/2018 | Krishnamurthy | G06K 9/6255 |
| 2018/0260664 A1 * | 9/2018 | Krishnamurthy | G06K 9/6273 |
| 2019/0016264 A1 * | 1/2019 | Potnis | B60D 1/64 |
| 2019/0092109 A1 * | 3/2019 | Carpenter | G05D 1/0223 |
| 2019/0311183 A1 * | 10/2019 | Wang | G06K 9/6268 |
| 2019/0369220 A1 * | 12/2019 | Vignon | A61B 8/5269 |
| 2019/0370666 A1 * | 12/2019 | Ros Sanchez | G06N 3/088 |
| 2020/0074266 A1 * | 3/2020 | Peake | G01S 17/931 |

(Continued)

FOREIGN PATENT DOCUMENTS

CN  101976435 B  10/2012

OTHER PUBLICATIONS

Wu et al., "Subspace-based prototyping and classification of chromosome images." IEEE transactions on image processing 14, No. 9 (2005): 1277-1287. (Year: 2005).*

(Continued)

*Primary Examiner* — Feng Niu
(74) *Attorney, Agent, or Firm* — Frank A. MacKenzie; Bejin Bieneman PLC

(57) ABSTRACT

A computer includes a processor and a memory, the memory storing instructions executable by the processor to apply a transform function to a plurality of images from a real-world dataset to generate a plurality of feature vectors, to apply a subspace generation algorithm to generate basis vectors of a subspace, and to project a simulated image onto the subspace to generate a realistic synthetic image.

16 Claims, 5 Drawing Sheets

(56) References Cited

U.S. PATENT DOCUMENTS

| | | | | |
|---|---|---|---|---|
| 2020/0089998 A1* | 3/2020 | Zagaynov | ............... | G06T 5/002 |
| 2020/0167161 A1* | 5/2020 | Planche | ................... | G06T 15/20 |
| 2020/0342652 A1* | 10/2020 | Rowell | ...................... | G06T 7/75 |
| 2021/0133510 A1* | 5/2021 | Boulanger | ............... | G06N 3/08 |
| 2021/0141986 A1* | 5/2021 | Ganille | ................ | G06K 9/6262 |
| 2021/0150267 A1* | 5/2021 | Boulanger | ............... | G06N 3/04 |

OTHER PUBLICATIONS

Christiano et al., "Transfer from simulation to real world through learning deep inverse dynamics model." arXiv preprint arXiv:1610.03518 (2016). (Year: 2016).*

Minhas et al., "A robust object detection approach using boosted anisotropic multiresolution analysis." In 2011 IEEE 54th International Midwest Symposium on Circuits and Systems (MWSCAS), pp. 1-4. IEEE, 2011. (Year: 2011).*

Dundar et al., "Domain stylization: A strong, simple baseline for synthetic to real image domain adaptation." arXiv preprint arXiv:1807.09384 (2018). (Year: 2018).*

Peng et al., "Synthetic to Real Adaptation with Generative Correlation Alignment Networks," 2018 IEEE Winter Conference on Applications of Computer Vision (WACV), 2018, pp. 1982-1991, doi: 10.1109/WACV.2018.00219. (Year: 2018).*

Zhang et al., "Synthetic-to-Real Domain Adaptation for Object Instance Segmentation," 2019 International Joint Conference on Neural Networks (IJCNN), 2019, pp. 1-7, doi: 10.1109/IJCNN.2019.8851791. (Year: 2019).*

Stein et al., "Genesis-rt: Generating synthetic images fortraining secondary real-world tasks." 2018 IEEE International Conference on Robotics and Automation (ICRA). IEEE, 2018. (Year: 2018).*

Sholingar, G., et al., "Domain adaptation using subspace projection for adding realism to simulated images," Ford, Greenfield Labs, Palo Alto, CA, 13 pages, 2019.

Zhu, J-Y., et al., "Unpaired Image-to-Image Translation using Cycle-Consistent Adversarial Networks," Berkeley AI Research (BAIR) laboratory, UC Berkeley, Nov. 15, 2018, 18 pages.

Isola, P., et al., "Image-to-Image Translation with Conditional Adversarial Networks," Berkeley AI Research (BAIR) Laboratory, UC Berkeley, Nov. 26, 2018, 17 pages.

Wang, M., et al., "Deep Visual Domain Adaptation: A Survey," School of Information and Communication Engineering, Beijing University of Posts and Telecommunications, Beijing, China, May 25, 2018, 20 pages.

* cited by examiner

IMAGE ENHANCEMENT FOR REALISM

BACKGROUND

Vehicles can be equipped with computing devices, networks, sensors and controllers to acquire data regarding the vehicle's environment and to operate the vehicle based on the data. Vehicle sensors can provide data concerning routes to be traveled and objects to be avoided in the vehicle's environment. Operation of the vehicle can rely upon acquiring accurate and timely data regarding objects in a vehicle's environment while the vehicle is being operated on a roadway. Vehicles may use neural networks to identify objects from image data collected by the vehicle sensors.

DETAILED DESCRIPTION

Figure 1A:
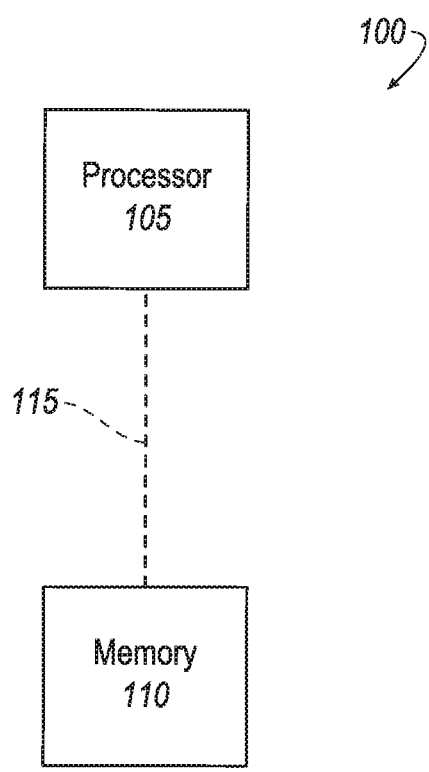
FIGS. 1A-1B are block diagrams of an example system for training a neural network.

A system includes a computer including a processor and a memory, the memory storing instructions executable by the processor to apply a transform function to a plurality of images from a real-world dataset to generate a plurality of feature vectors, apply a subspace generation algorithm to generate basis vectors of a subspace, and project a simulated image onto the subspace to generate a synthetic image.

The instructions can further include instructions to input the synthetic image to a neural network to train the neural network.

The instructions can further include instructions to input image data from a sensor to the neural network to identify one of a hitch ball attached to a vehicle or an angle between two parts of a trailer attached to the vehicle.

The instructions can further include instructions to apply the transform function to the simulated image to generate a simulated feature vector, to project the simulated feature vector onto the subspace to generate a synthetic feature vector, and to apply an inverse of the transform function to the synthetic feature vector to generate the synthetic image.

The transform function can be one of a discrete cosine transform, a Fourier transform, a convolutional autoencoder, or a discrete wavelet transform.

The instructions can further include instructions to generate a plurality of synthetic images from a plurality of simulated images and to train a neural network by inputting the plurality of synthetic images to the neural network.

The instructions can further include instructions to generate a plurality of simulated images from an image-generating engine and to generate the plurality of synthetic images from the plurality of simulated images.

The subspace generation algorithm can be one of a principal component analysis algorithm, an independent component analysis algorithm, or a sparse dictionary learning algorithm.

The instructions can further include instructions to assign, to a set of feature vectors that includes some but not all of the plurality of feature vectors, feature vectors from the plurality of feature vectors that have a sum of eigenvalues above a threshold in a covariance matrix of all of the plurality of feature vectors and to generate the basis vectors of the subspace from eigenvectors of the set of feature vectors.

The instructions can further include instructions to project the feature vector generated from the simulated image onto the subspace to include a realistic feature not present in the simulated image.

A method includes applying a transform function to a plurality of images from a real-world dataset to generate a plurality of feature vectors, applying a subspace generation algorithm to generate basis vectors of a subspace, and projecting a simulated image onto the subspace to generate a synthetic image.

The method can further include inputting the synthetic image to a neural network to train the neural network.

The method can further include inputting image data from a sensor to the neural network to identify one of a hitch ball attached to a vehicle or an angle between two parts of a trailer attached to the vehicle.

The method can further include applying the transform function to the simulated image to generate a simulated feature vector, projecting the simulated feature vector onto the subspace to generate a synthetic feature vector, and applying an inverse of the transform function to the synthetic feature vector to generate the synthetic image.

The method can further include generating a plurality of synthetic images from a plurality of simulated images and training a neural network by inputting the plurality of synthetic images to the neural network.

The method can further include generating a plurality of simulated images from an image-generating engine and generating the plurality of synthetic images from the plurality of simulated images.

The method can further include assigning, to a set of feature vectors that includes some but not all of the plurality of feature vectors, feature vectors from the plurality of feature vectors that have a sum of eigenvalues above a threshold in a covariance matrix of all of the plurality of feature vectors and generating the basis vectors of the subspace from eigenvectors of the set of feature vectors.

The method can further include projecting the feature vector generated from the simulated image onto the subspace to include a realistic feature not present in the simulated image.

Further disclosed is a computing device programmed to execute any of the above method steps. Yet further disclosed is a vehicle comprising the computing device. Yet further disclosed is a computer program product, comprising a computer readable medium storing instructions executable by a computer processor, to execute any of the above method steps.

Neural networks require large datasets for training. To train a neural network to perform a task, e.g., to identify objects in images, reference images collected by sensors in a real-world environment can be input to the neural network along with the ground truth labels. A cost function of the neural network can be adjusted until the output of the neural network substantially identifies objects represented in the reference images. The training may require large amounts of images consuming large and/or unwieldy amounts of computer memory. It may not be practical to collect real data for all possible scenarios in order to train the neural network. Neural networks may therefore be trained with a combination of real and simulated data. However, simulated data may lack realism and may make the training sub-optimal.

Realism can be added to the simulated images based on the real data collected to improve training the neural network. Using a real-world dataset of images, a computer uses an invertible feature transform algorithm to convert each image in the real-world dataset into a "realistic" feature vector, i.e., each image present in the real-world dataset of images is now represented as a "N" dimensional feature vector. The computer can then generate a subspace of these realistic feature vectors. The computer can generate simulated images with an image-generating engine, convert the simulated image into a "simulated" feature vector using the same feature transform as used for real-world dataset, and by projecting the simulated feature vector onto the subspace, a resulting synthetic image is obtained by applying the inverse feature transform to the projected feature vector. The computer thus adds realism to the simulated image by projecting the simulated feature vector onto the real subspace, improving suitability of the images for training the neural network.

Figure 1B:
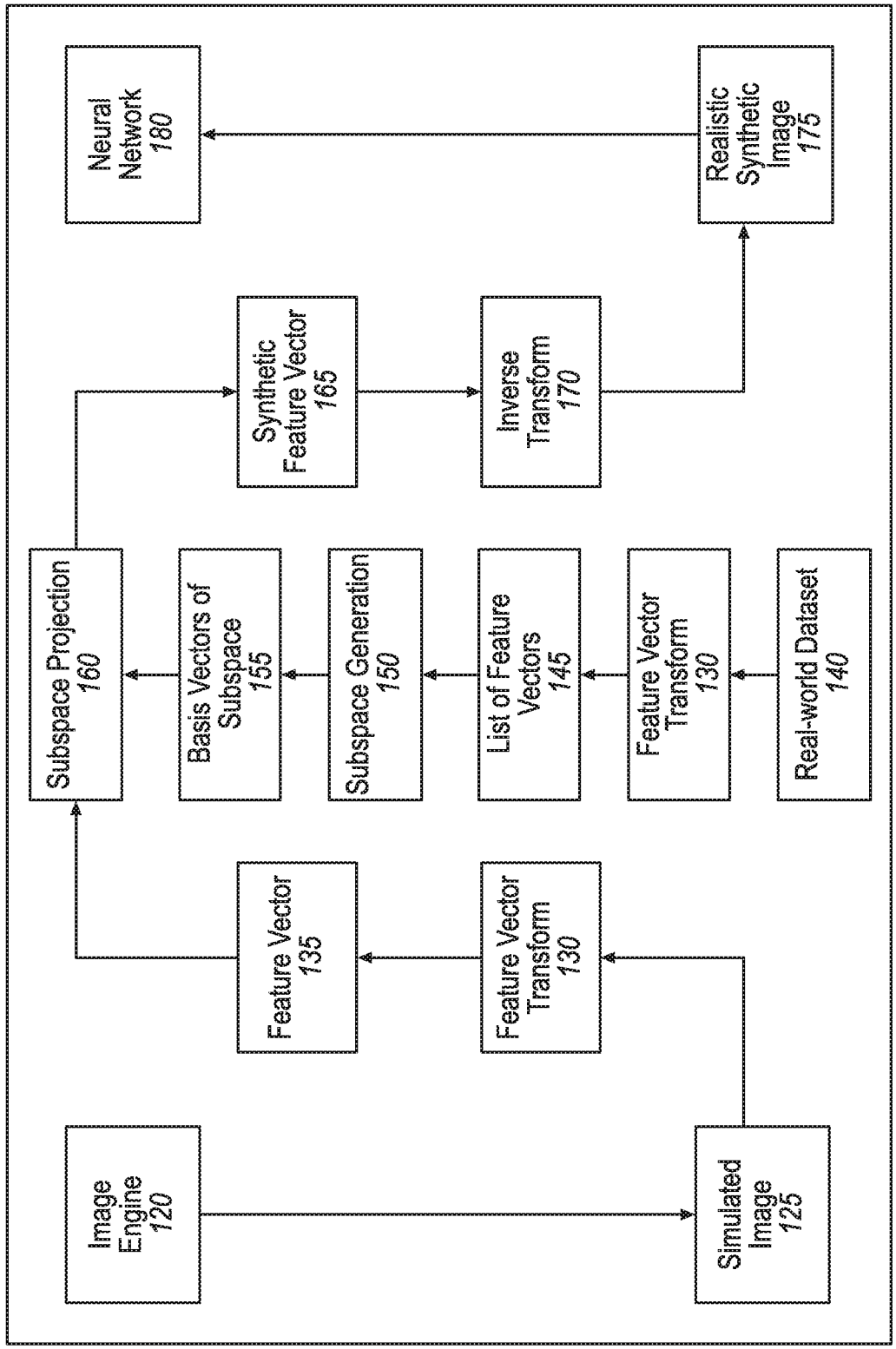

FIGS. 1A-1B are block diagrams of an example system for training a neural network with realistic images. The system includes a computer 100. The computer 100 includes a processor 105 and a memory 110, as shown in FIG. 1A. The memory 110 can be of any type, e.g., hard disk drives, solid state drives, servers, or any volatile or non-volatile media. The memory 110 can be a separate device from the processor 105. The memory 110 can store instructions executable by the processor 105. The processor 105 and the memory 110 communicate over a communications bus 115 such as a CAN bus, LIN bus, etc.

The computer 100 includes an image-generating engine 120, as shown in FIG. 1B. The image-generating engine 120 (or image engine 120) is programming of the computer 100 that the processor 105 can follow to generate simulated images 125. That is, an "engine" is software programming, and the computer 100 executes instructions provided by the image-generating engine 120 to generate simulated images as disclosed herein. An "image" is a two-dimensional array of values that encode visual data, e.g., a photograph. For example, the image can be a two-dimensional array of values. Each element of the array can be a grayscale value (i.e., a natural number between 0 and 100) of a pixel of a digital photograph. In another example, each element of the array can be a red-blue-green (RGB) value (e.g., a hexadecimal number between 00 and FF for each of red, blue, and green values) of a pixel of a digital photograph. The image-generating engine 120 can be, e.g., Unreal Engine, Unity®, CryEngine®, id Tech®, etc.

A "simulated" image 125 is an image that is generated by programming of the computer 100, e.g., with the image-generating engine 120, without input from a real-world image. That is, the simulated image 125 can be an array of grayscale values representing pixels of an image. The image-generating engine 120 typically can generate a plurality of simulated images 125 faster and with more diverse scenarios than a camera may collect real-world images. The simulated images 125 can provide input data for a neural network 180. The simulated images 125 can be stored in the memory 110.

The computer 100 includes a real-world dataset 140 of images, as shown in FIG. 1B. The real-world dataset 140 can be a plurality of images captured by a physical device, e.g., a camera. That is, the real-world dataset 140 includes actual images of an environment, e.g., a roadway, a vehicle, etc., i.e., images that are not generated by the image-generating engine 120. The computer 100 can retrieve the real-world dataset 140 of images from, e.g., an external server that stores images collected by cameras disposed on vehicles. Alternatively or additionally, the computer 100 can include the real-world dataset 140 of images in the memory 110.

The computer 100 can use a transform function 130 to extract a feature vector 135 from the simulated image 125 and a feature vector 145 from an image of the real-world dataset 140 of images. A "feature vector" 135, 145 is a 1-dimensional array of values that encode information from the 2-dimensional image of the real-world dataset 140. Each value of the feature vector 135, 145 identifies a characteristic of a pixel of the image, e.g., an intensity, an RGB value, a gradient magnitude, an indicator that the pixel is or is not at an edge of an object, etc. As described below, the computer 100 can apply a transform function 130 to the image to generate the feature vector 135, 145. A transform function 130 in the present context means a mathematical function that converts the values of the images into a transformed domain (e.g., a frequency domain when the transform function 130 is a Fourier transform) in which features are represented as values and arranged into the feature vector 135, 145.

The computer 100 applies a subspace generation algorithm 150 to generate a subspace 155, as shown in FIG. 1B. As described below, a "subspace" in the present context is a set of basis vectors, i.e., linearly independent vectors defining a space, generated from the real-world dataset 140 that describe feature vectors 145 of the images of the real-world dataset 140. That is, any feature vector in the subspace 155 can be expressed as a sum of the basis vectors multiplied by respective scalar values. For example, if the subspace 155 is a two-dimensional plane, the basis vectors can be a horizontal unit vector $\hat{\imath}$ and a vertical unit vector $\hat{\jmath}$. The computer 100 can project a feature vector 135 obtained from the simulated image 125 onto the subspace 155 (i.e., subspace projection 160) to output a "synthetic" feature vector 165, i.e., an feature vector that includes the features that are present in the subspace 155. In this context, to "project" the simulated feature vector 135 onto the subspace 155, i.e., subspace projection 160, means to map each feature vector 135 onto the basis vectors of the subspace 155.

Because the subspace 155 is generated from the real-world dataset 140, the synthetic feature vector 165 includes features that are present in the real-world dataset 140. That is, the synthetic feature vector 165 includes "realistic" features, i.e., features that are present in the real-world dataset 140. The computer 100 can apply an inverse transform 170 to transform the synthetic feature vector 165 to a realistic synthetic image 175.

The computer 100 can input the synthetic images 175 to a neural network 180, as shown in FIG. 1B. The neural network 180 is programming of the computer 100 that receives an image as input and outputs an identification of objects in the image. For example, the neural network 180 can be a deep neural network (DNN). The DNN can include multiple nodes, and the nodes can be arranged so that the DNN includes an input layer, one or more hidden layers, and an output layer. Each layer of the DNN can include a plurality of nodes. The nodes are sometimes referred to as artificial neurons because they are designed to emulate biological, e.g., human, neurons. A set of inputs to each neuron are each multiplied by respective weights. The weighted inputs can then be summed in an input function to provide, possibly adjusted by a bias, a net input. The net input can then be provided to an activation function, which in turn provides a connected neuron an output. The activation function can be a variety of suitable functions, typically selected based on empirical analysis. The DNN can be trained to accept data as input and generate an output based on the input. The DNN can be trained with ground truth data, i.e., data about a real-world condition or state such as the real-world dataset 140 of images. Weights can be initialized by using a Gaussian distribution, for example, and a bias for each node can be set to zero. Training the DNN can include updating weights and biases via suitable techniques such as backpropagation with optimizations. Ground truth data can include, but is not limited to, data specifying objects within an image or data specifying a physical parameter, e.g., angle, speed, distance, or angle of object relative to another object. For example, the ground truth data may be data representing objects and object labels. In another example, the neural network 180 can be a generative adversarial network (GAN). A GAN is a deep neural network that employs a class of artificial intelligence algorithms used in machine learning and implemented by a system of two neural networks contesting each other in an adversarial zero-sum game framework.

Because the synthetic images 175 include the features present in the real-world dataset 140, the synthetic images 175 include realistic features, as described above. The neural network 180 can, based on the realistic features of the synthetic images 175, adjust weights of the inputs to minimize a cost function to recognize the features of the synthetic images 175. Thus, the synthetic images 175 can train the neural network 180 with realistic simulated images, i.e., images including realistic feature vectors, generated by the image-generating engine 120, improving the accuracy and precision of the neural network 180. When the neural network 180 is trained, the computer 100 can input images from, e.g., a vehicle sensor into the neural network 180 to, e.g., identify objects in the images, identify an angle between two parts of a trailer attached to a vehicle, identify a hitch ball attached to a rear end of a vehicle, etc. For example, the neural network 180 can be installed onto a vehicle computer, and the vehicle computer can input images collected from sensors to the neural network 180 to identify objects to avoid.

Figure 2:
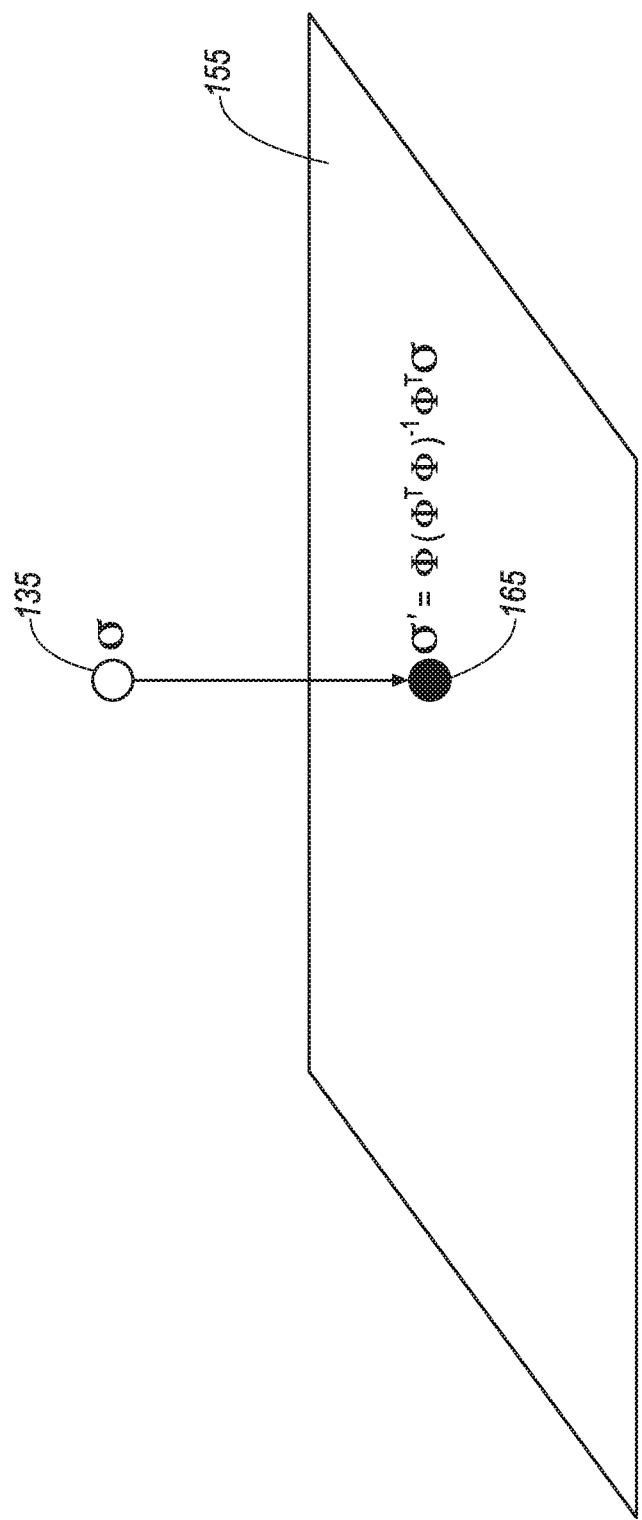
FIG. 2 illustrates projecting a simulated image onto a subspace.

FIG. 2 illustrates subspace projection 160 of the feature vector 135 obtained from a simulated image 125 onto the subspace 155. As described above, the projection of the feature vector 135 of the simulated image 125 is a synthetic feature vector 165 of the synthetic image 175 that can be retrieved by applying the inverse transform function 170, as described below, to the synthetic feature vector 165. The synthetic image 175 can be input to a neural network 180 to train the neural network 180, as described above.

The computer 100 can generate the subspace 155 from the real-world dataset 140 of images. The computer 100 can apply a transform function $\Psi$ to the images in the real-world dataset 140 to generate a plurality of feature vectors 145. As described above, a "feature vector" is a 1-dimensional array of values that encode information from the 2-dimensional image of the real-world dataset 140. The transform function $\Psi$ receives the image as input and provides a feature vector 145 as output. The transform function $\Psi$ can be, e.g., a Fourier transform, a discrete cosine transform, a convolutional autoencoder, a discrete wavelet transform etc. For example, the discrete cosine transform ("DCT") can receive as input a 2-dimensional array representing grayscale values of the pixels of the image, apply, to each pixel of the 2-dimensional array, a sum of cosine functions to the value of each pixel, and output the sum as a frequency component in a 2-dimensional array. The computer 100 can generate a 1-dimensional feature vector of the frequency components of the 2-dimensional array by sequentially assigning values to the 1-dimensional feature vector 145 from each row of the 2-dimensional array. That is, the 1-dimensional feature vector 145 is a list of the values from each successive row of the 2-dimensional array. The computer 100 can apply the transform function $\Psi$ to all of the plurality of images in the real-world dataset 140 to generate a plurality of feature vectors 145. The transform function $\Psi$ is invertible, i.e., an inverse function $\Psi^{-1}$ exists and, for an input x, $\Psi^{-1}(\Psi(x))=x$. That is, the inverse transform function $\Psi^{-1}$ receives a feature vector as input and provides an image as output.

The computer 100 can generate the subspace 155 from the feature vectors 145 with a subspace generation algorithm 150, e.g., principal component analysis, independent component analysis, sparse dictionary learning, etc. For example, the computer 100 can generate the subspace 155 with a principal component analysis algorithm. The computer 100 can generate an array of feature vectors S in which each column is one of the feature vectors generated by the transform function $\Psi$ described above. The computer 100 can generate a covariance matrix cov(S) that is the covariance of the array S. That is, each element of the covariance matrix cov(S) is the statistical covariance, as is known, of the corresponding element in the array S.

Upon generating the covariance matrix cov(S), the computer 100 can identify the eigenvectors v and eigenvalues $\lambda$ of the covariance matrix cov(S) using a conventional algorithm, e.g., solving determinants of submatrices of the covariance matrix cov(S). Upon determining the eigenvalues $\lambda$, the computer 100 can list the eigenvalues $\lambda$ in descending order. The computer 100 can incrementally sum the eigenvalues $\lambda$, i.e., add the eigenvalues $\lambda$ one at a time, until the sum of the eigenvalues $\lambda$ exceeds a threshold. The eigenvalue threshold can be a specified percentage of the total eigenvalues $\lambda$ of the covariance matrix cov(S), e.g., 90%, 95%, 99%, etc. That is, the computer 100 can sum all of the eigenvalues $\lambda$ to determine a total sum $\Lambda$ and can incrementally sum the eigenvalues $\lambda$ until a current sum $\bar{\lambda}$ exceeds the eigenvalue threshold, e.g., $\bar{\lambda} \geq 0.99\Lambda$ for a threshold of 0.99. The computer 100 can determine the eigenvalue threshold as a specified number of eigenvectors v, as described below, to define the subspace 155. Alternatively or additionally, the computer 100 can determine the eigenvalue threshold based on an allotted storage capacity in the memory 110. That is, many of the eigenvalues $\lambda$ may contribute to a small proportion of the total sum $\Lambda$, e.g., 40% of the eigenvalues $\lambda$ may sum to 1% of the total sum $\Lambda$. Thus, in this example, when the threshold is 0.99, the computer 100 can reduce number of eigenvalues $\lambda$ considered by 40%, advantageously reducing storage space used by the memory 110 and/or computations performed by the processor 105 to generate and store the subspace 155.

When the sum of the eigenvalues $\lambda$ exceeds the threshold, the computer 100 can identify the eigenvectors v associated with the summed eigenvalues $\lambda$. Each eigenvector v defines one of the basis vectors $\Phi$ of the subspace 155. That is, the subspace 155 is a multi-dimensional vector space defined by the basis vectors $\Phi$. Because each eigenvector v is identified from the feature vectors 145 of the real-world dataset 140, each basis vector $\Phi$ represents a feature vector 145 of the real-world dataset 140, i.e., a "realistic" feature vector. By mapping feature vectors 135 obtained from the simulated images 125 onto the basis vectors $\Phi$ of the subspace 155, the computer 100 finds a feature vector 145 in the subspace 155 which is closest to the feature vector of simulated images 125 to generate synthetic images 175.

Alternatively, the computer 100 can generate the subspace 155 with an independent component analysis algorithm. The computer 100 can input the feature vectors 145 to a cost function that, when minimized, generates basis vectors Φ for the subspace 155:

$$\frac{r}{m}\sum_{i=1}^{m}\|W^TWx^i - x^i\|_2^2 + \sum_{i=1}^{m}\sum_{j=1}^{k}g(W_j x^i) \quad (1)$$

where g is a nonlinear convex function such as g(t)=log (cos h(t)), W is a weight matrix, m is the total number of feature vectors 145, k is the number of desired features, $W_j$ is one row of the weight matrix associated with one of the feature vectors 145, x is the set of feature vectors 145, and r is a regularization coefficient for the weight matrix W. A minimized weight matrix W* is the weight matrix W when the cost function is minimized. The output weight matrix W* is used to generate the basis vectors: Φ=xW*. Yet alternatively, the computer 100 can generate the subspace 155 with a conventional sparse dictionary learning algorithm.

The computer 100 can map simulated images 125 onto the subspace 155 to generate synthetic images 175. In this example, the simulated image 125 is represented with the symbol Σ. The computer 100 can apply the transform function Ψ to a simulated image 125 to generate a simulated feature vector σ:

$$\Psi(\Sigma)=\sigma \quad (2)$$

Upon generating the simulated feature vector σ of the simulated image 125, the computer 100 can project the simulated feature vector σ onto the subspace 155 with the basis vectors Φ according to a conventional projection algorithm to generate a synthetic feature vector σ':

$$\sigma'=\Phi(\Phi^T\Phi)^{-1}\Phi^T\sigma \quad (3)$$

where $\Phi^T$ is the transposition of the basis vectors Φ and the "−1" superscript indicates the inverse operation, i.e., the projection algorithm uses the mathematical inverse of the transformation $\Phi^T\Phi$.

Upon generating the synthetic feature vector σ', the computer 100 can apply the inverse transform function $\Psi^{-1}$ to generate a synthetic image 175, represented with the symbol Σ':

$$\Psi^{-1}(\sigma')=\Sigma' \quad (4)$$

Thus, the computer 100 can generate a synthetic image 175 from the synthetic feature vector 165 determined from the projection of the feature vector 135 of the simulated image 125 onto the subspace 155. That is, the synthetic image 175 includes the features of the simulated image 125 that are present in the subspace 155, and thus the real-world dataset 140. The synthetic image 175 thus includes features of the simulated image 125 in the real-world dataset 140. The synthetic image 175 is a "realistic" image, i.e., an image that includes features present in the real-world dataset 140 of images. By including features the real-world dataset 140, inputting the synthetic image 175 to the neural network 180 trains the neural network 180 as an image from the real-world dataset 140 would train the neural network 180.

Figure 3:
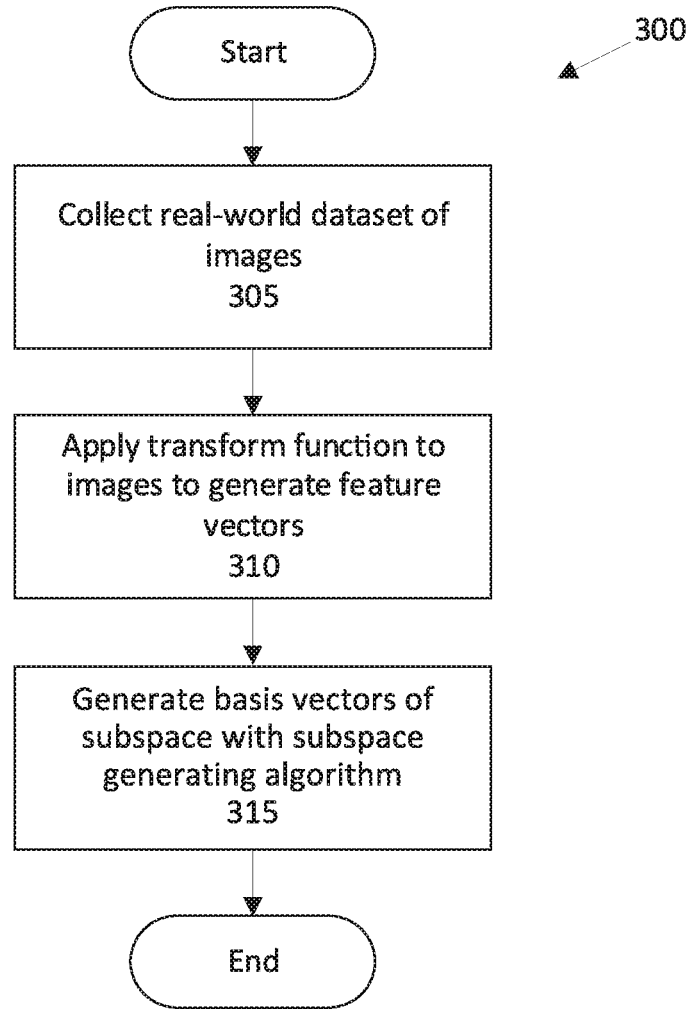
FIG. 3 is a diagram of an example process for generating the subspace.

FIG. 3 is a diagram of an example process 300 for generating a subspace 155. The process 300 begins in a block 305, in which a processor 105 of a computer 100 retrieves a real-world dataset 140 of images. As described above, the real-world dataset 140 of images can be images collected by a physical device, e.g., a camera, of an environment around a vehicle. The processor 105 can retrieve the real-world dataset 140 of image from a memory 110 over a bus 115.

Next, in a block 310, the processor 105 applies a transform function 130 to each image of the real-world dataset 140 of images to generate a plurality of feature vectors 145. The feature vectors 145 are 1-dimensional arrays of values that encode information from the images of features in the real-world dataset 140. The transform function 130 transforms each image into a single feature vector 145.

Next, in a block 315, the processor 105 applies a subspace generating algorithm 150 to the list of feature vectors 145 to generate basis vectors of the subspace 155. As described above, the subspace generating algorithm 150 can be, e.g., principal component analysis, independent component analysis, sparse dictionary learning, etc. For example, in a principal component analysis algorithm, the processor 105 can identify a plurality of eigenvectors of a covariance matrix of the list of feature vectors 145. The processor 105 can use the eigenvectors as the basis vectors for the subspace 155. As described below in the process 400, the processor 105 can project a simulated image 125 onto the subspace 155 to generate a synthetic image 175 for training a neural network 180. Following the block 315, the process 300 ends.

Figure 4:
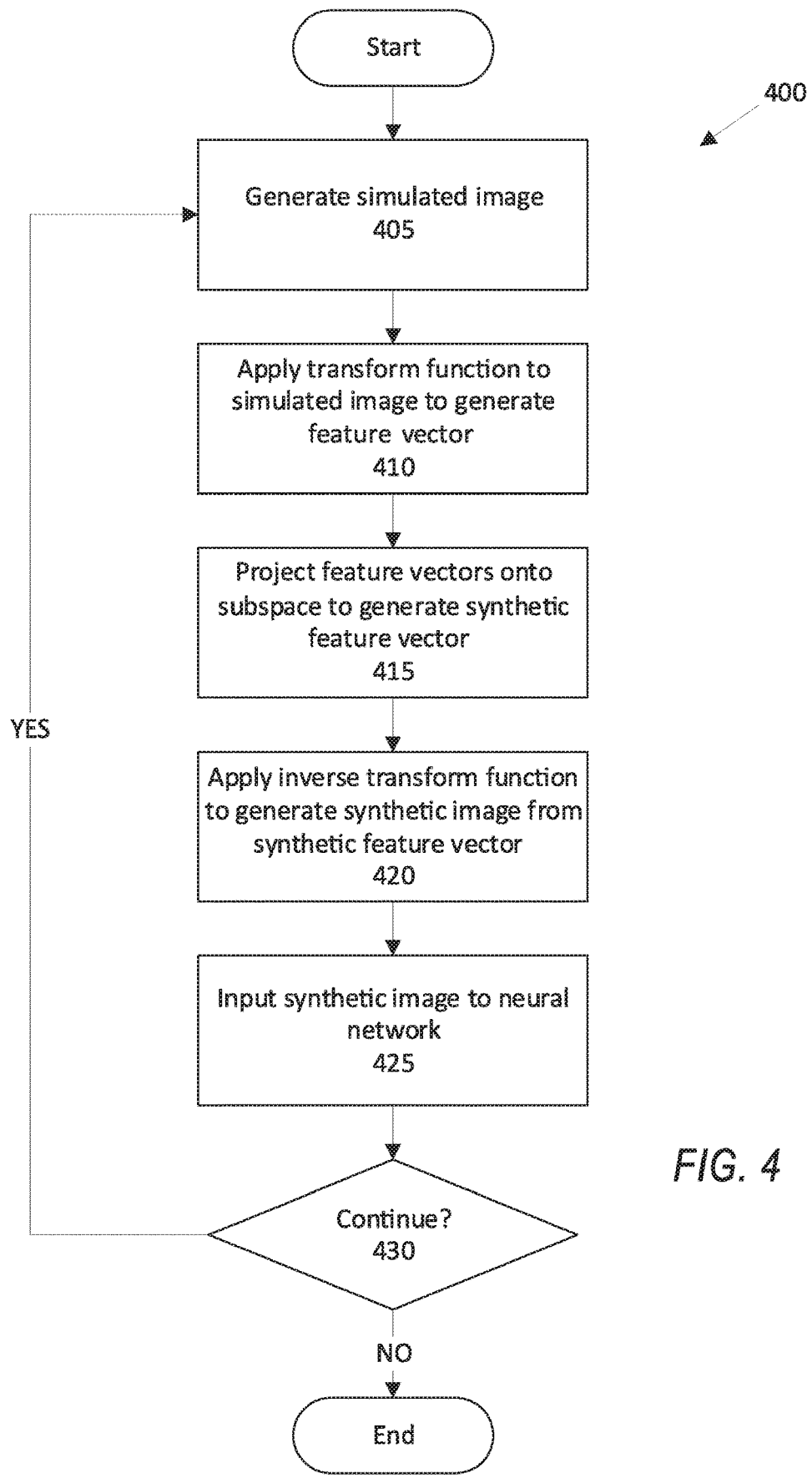
FIG. 4 is a diagram of an example process for generating synthetic images from projecting simulated images onto the subspace.

FIG. 4 is a block diagram of an example process 400 for generating a synthetic image 175 to train a neural network 180. The process 400 begins in a block 405, in which a processor 105 of a computer 100 generates a simulated image 125 with an image-generating engine 120. The image-generating engine 120 is programming executable by the processor 105 to generate an image without input from a real-world sensor, e.g., a camera.

Next, in a block 410, the processor 105 applies a transform function 130 to the simulated image 125 to generate a feature vector 135. As described above, the transform function 130 can be an invertible function that transforms the simulated image 125 into a transformed domain, e.g., a frequency domain. The transform function 130 can be, e.g., a discrete cosine transform function, a wavelet transform, an autoencoder, etc.

Next, in a block 415, the processor 105 projects the feature vector 135 onto a subspace 155, as described above, to generate a synthetic feature vector 165. The processor 105 uses a projection algorithm 160, as described above, to project the feature vectors 135 of the simulated image 125 onto the subspace 155. The projected feature vector 165 is a "synthetic" feature vector 165, i.e., feature vectors of a synthetic image 175.

Next, in a block 420, the processor 105 applies the inverse 170 of the transform function 130 to generate the synthetic image 175 from the synthetic feature vector 165. As described above, the inverse 170 of the transform function 130 receives a feature vector 165 as input and generates the synthetic image 175 associated with inputted feature vector 165 as output. The synthetic image 175, having features represented by the basis vectors in the subspace 155, includes realistic features.

Next, in a block 425, the processor 105 inputs the synthetic image 175 to the neural network 180 to train the neural network 180. As described above, the synthetic image 175 provides a reference image to the neural network 180 to identify features thereof, and the neural network 180 can minimize a cost function to identify the features. Because the synthetic image 175 is generated from the basis vectors of the subspace 155, which were generated from the feature vectors 145 of the images of the real-world dataset 140, the synthetic image 175 is more realistic than the simulated image 125.

Next, in a block 430, the processor 105 determines whether to continue the process 400. For example, the processor 105 can determine to continue the process 400 upon determining that the neural network 180 requires additional images for training. If the processor 105 determines to continue, the process 400 returns to the block 405 to generate another simulated image 125. Otherwise, the process 400 ends.

Computing devices discussed herein, including the computer 100, include processors and memories, the memories generally each including instructions executable by one or more computing devices such as those identified above, and for carrying out blocks or steps of processes described above. Computer executable instructions may be compiled or interpreted from computer programs created using a variety of programming languages and/or technologies, including, without limitation, and either alone or in combination, Java™, C, C++, Visual Basic, Java Script, Python, Perl, HTML, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in the computer 100 is generally a collection of data stored on a computer readable medium, such as a storage medium, a random access memory, etc.

A computer readable medium includes any medium that participates in providing data (e.g., instructions), which may be read by a computer. Such a medium may take many forms, including, but not limited to, non volatile media, volatile media, etc. Non volatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 400, one or more of the steps could be omitted, or the steps could be executed in a different order than shown in FIG. 4. In other words, the descriptions of systems and/or processes herein are provided for the purpose of illustrating certain embodiments and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

What is claimed is:

1. A system, comprising a computer including a processor and a memory, the memory storing instructions executable by the processor to:
  apply a transform function to a plurality of images from a real-world dataset to generate a plurality of feature vectors;
  generate a plurality of simulated images from an image-generating engine, wherein the image-generating engine includes instructions to generate the simulated images without input from a real-world image;
  apply a subspace generation algorithm to generate basis vectors of a subspace; and
  project the simulated images onto the subspace to generate a plurality of synthetic images.

2. The system of claim 1, wherein the instructions further include instructions to input the synthetic images to a neural network to train the neural network.

3. The system of claim 2, wherein the instructions further include instructions to input image data from a sensor to the neural network to identify one of a hitch ball attached to a vehicle or an angle between two parts of a trailer attached to the vehicle.

4. The system of claim 1, wherein the instructions further include instructions to apply the transform function to the simulated images to generate simulated feature vectors, to project the simulated feature vectors onto the subspace to generate synthetic feature vectors, and to apply an inverse of the transform function to the synthetic feature vectors to generate the synthetic images.

5. The system of claim 1, wherein the transform function is one of a discrete cosine transform, a Fourier transform, a convolutional autoencoder, or a discrete wavelet transform.

6. The system of claim 1, wherein the subspace generation algorithm is one of a principal component analysis algorithm, an independent component analysis algorithm, or a sparse dictionary learning algorithm.

7. The system of claim 1, wherein the instructions further include instructions to assign, to a set of feature vectors that includes some but not all of the plurality of feature vectors, feature vectors from the plurality of feature vectors that have a sum of eigenvalues above a threshold in a covariance matrix of all of the plurality of feature vectors and to generate the basis vectors of the subspace from eigenvectors of the set of feature vectors.

8. The system of claim 1, wherein generating the basis vectors of the subspace is based on the feature vectors of the images from the real-world dataset, and the instructions further include instructions to project the feature vectors generated from the simulated images onto the subspace so as to include a realistic feature in the synthetic images not present in the simulated image from the subspace.

9. A method, comprising:
  applying a transform function to a plurality of images from a real-world dataset to generate a plurality of feature vectors;

generating a plurality of simulated images from an image-generating engine, wherein the image-generating engine includes instructions to generate the simulated images without input from a real-world image;

applying a subspace generation algorithm to generate basis vectors of a subspace; and projecting the simulated images onto the subspace to generate a plurality of synthetic images.

10. The method of claim 9, further comprising inputting the synthetic images to a neural network to train the neural network.

11. The method of claim 10, further comprising inputting image data from a sensor to the neural network to identify one of a hitch ball attached to a vehicle or an angle between two parts of a trailer attached to the vehicle.

12. The method of claim 9, further comprising applying the transform function to the simulated images to generate simulated feature vectors, projecting the simulated feature vectors onto the subspace to generate synthetic feature vectors, and applying an inverse of the transform function to the synthetic feature vectors to generate the synthetic images.

13. The method of claim 9, wherein the transform function is one of a discrete cosine transform, a Fourier transform, a convolutional autoencoder, or a discrete wavelet transform.

14. The method of claim 9, wherein the subspace generation algorithm is one of a principal component analysis algorithm, an independent component analysis algorithm, or a sparse dictionary learning algorithm.

15. The method of claim 9, further comprising assigning, to a set of feature vectors that includes some but not all of the plurality of feature vectors, feature vectors from the plurality of feature vectors that have a sum of eigenvalues above a threshold in a covariance matrix of all of the plurality of feature vectors and generating the basis vectors of the subspace from eigenvectors of the set of feature vectors.

16. The method of claim 9, wherein generating the basis vectors of the subspace is based on the feature vectors of the images from the real-world dataset, the method further comprising projecting the feature vectors generated from the simulated images onto the subspace so as to include a realistic feature in the synthetic images not present in the simulated image from the subspace.

* * * * *